June 6, 1961 R. N. BROWN 2,987,606
ELECTRIC COOKING VESSEL
Filed May 7, 1958
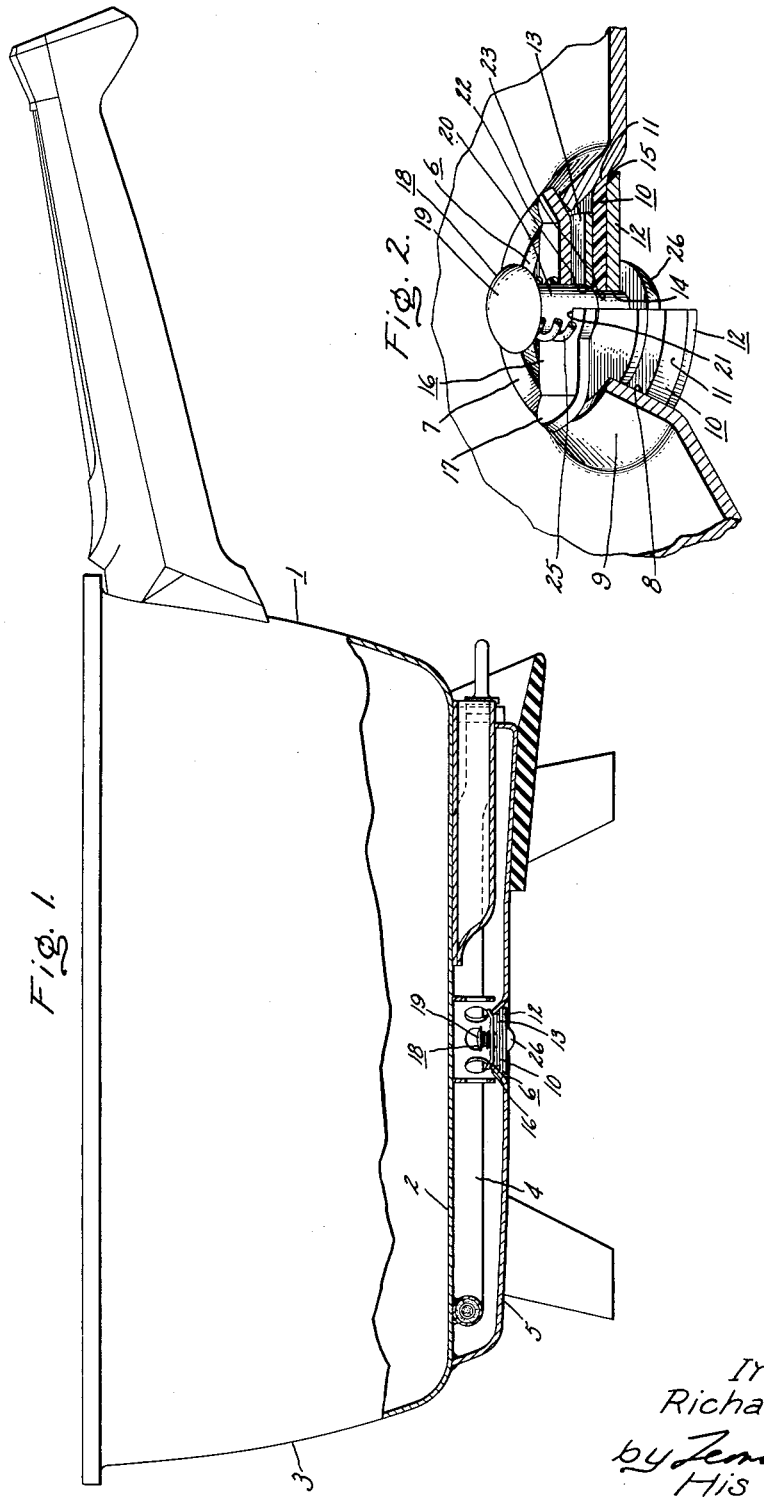
Inventor:
Richard N. Brown,
by {signature}
His Attorney.

United States Patent Office 2,987,606
Patented June 6, 1961

2,987,606
ELECTRIC COOKING VESSEL
Richard N. Brown, Spencerport, N.Y., assignor to General Electric Company, a corporation of New York
Filed May 7, 1958, Ser. No. 733,768
3 Claims. (Cl. 219—44)

This invention relates to an electric cooking vessel, and more particularly, to a means for venting and sealing a cooking vessel heating element enclosure.

In the United States patent application Serial No. 725,527, Harvey Levine, filed April 1, 1958, and assigned to the same assignee as the present invention, there is described an electric cooking vessel having a bottom cover fixed to the bottom wall of the vessel to form an enclosure for an electric heating element. A vent aperture is formed in the bottom cover and a blow out plug is provided for the aperture. This invention is also concerned with a means for venting and sealing that type enclosure and has as its general object the provision of a new and improved vent and seal arrangement in which the seal forming elements are held to the cover while gases under pressure may be released from the enclosure.

It is another object of this invention to provide an improved seal which can be readily secured in an aperture formed in a bottom cover after the cover has been fixed to the bottom wall of a cooking vessel.

It is a still further object of this invention to provide an improved seal arrangement for the bottom cover of an electric cooking vessel which is simple in structure, capable of being manufactured and assembled at low cost, and formed to provide a pleasing appearance.

In accordance with one aspect of this invention, a cover is fixed to the underside of the bottom wall of a cooking vessel to thereby form an enclosure for an electric heating element. An aperture having an outwardly facing seat and an inwardly facing lip is formed in the bottom cover for providing a vent for the enclosure and a seal is provided for the aperture. The seal comprises a resilient washer in sealing engagement with the seat, a clamp arranged for engagement with the lip of said aperture, and a spring in engagement with the clamp for urging the washer into sealing engagement with the seat. By this arrangement, a simple, easily manufactured and assembled seal means is provided for a cooking vessel heating element enclosure which effectively prevents the entry of water and foreign matter into said enclosure while the cooking vessel is being washed and yet, is so sensitive to the pressure within the enclosure that a slight increase in pressure of the trapped air will cause the washer to lift and relieve the pressure within the enclosure while the resilient washer is held to the cover by the clamp.

Other objects and attendant advantages of this invention will be apparent from the following description taken in connection with the accompanying drawing in which:

FIG. 1 is a side elevational view partially in cross-section of an electric cooking vessel provided with the improved pressure release seal; and FIG. 2 is an enlarged fragmentary view, partially in cross-section of the improved pressure release seal.

Referring now to FIG. 1 of the drawing, therein is shown an electric cooking vessel generally designated by reference numeral 1, having a bottom wall 2 and an upright side wall 3 formed integrally therewith. An electric heating element 4 is preferably fixed to the underside of bottom wall 2, and a dished bottom cover 5 is fixed, as by brazing, to the bottom wall 2 of the cooking vessel to form a sealed enclosure for heating element 2.

In order to permit the brazing gases to escape from the enclosure, an aperture 6 is formed in bottom cover 5 before the cover is brazed to the bottom wall 2 of the cooking vessel. After brazing, aperture 6 may receive a cleaning tube or jet for washing out the highly corrosive brazing fluxes, and during cooking, aperture 6 permits the release of trapped gases under pressure from the enclosure.

For the purpose of providing superior sealing surfaces, aperture 6 is uniquely shaped as shown in FIG. 2. According to a preferred method of manufacture, the cover 5 is cut to form a generally cylindrical lip surface 7, and the bottom surface of the cover adjacent to the lip surface 7 is inwardly depressed to provide aperture 6 with an enlarged frusto-conical seat portion 8 formed from the bottom surface of the cover. It can be seen that the deforming operation causes lip surface 7 to become generally frusto-conical in shape. It is quite apparent that the widest or greatest dimension of aperture 6 is at the juncture of frusto-conical seat portion 8 with the generally flat bottom cover 5, that the aperture 6 tapers inwardly so that the narrowest dimension is at the juncture of seat surface 8 and lip surface 7, and that it widens from such juncture to the juncture of the lip surface 7 with the inner frusto-conical surface 9 of the bottom cover.

I provide a new and improved washer means for effecting a watertight seal for aperture 6. As shown more particularly in FIG. 2, this arrangement includes a resilient washer 10 arranged to have its outer peripheral surface 11 in sealing engagement with outwardly facing frusto-conical seat 8. Washer 10 is preferably formed of silicone rubber and in order to insure that its shape will be maintained in spite of the flowable nature of silicone rubber at elevated pressures and cooking vessel temperatures, the washer is suitably sandwiched between two sheet metal aluminum washers 12 and 13. Since the washer sandwich 10, 12, 13 is designed for cooperation with frusto-conical seat 8, it can be readily seen that the diameter of inner washer 13 is less than the diameters of resilient washer 10 and outer washer 12. Preferably, the peripheral surface of washer 12 is formed frusto-conical in shape to mate with the frusto-conical seat 8 of the aperture, and the diameter of the inner flat surface of aluminum washer 12 is equal to the diameter of silicone rubber washer 10. Thus, the tendency for the silicone rubber to ooze out under the inner peripheral edge 14 of aluminum washer 12 is minimized. Further, the outer peripheral edge 15 of washer 12 is designed to be in line contact with the outer portion of frusto-conical seat 8, thereby decreasing the tendency for dirt or grease to become trapped between the peripheral surface 15 of washer 12 and the frusto-conical seat 8. Clearly, the provision of such line contact also makes the bottom surface of the cooking vessel more appealing in appearance.

A unique arrangement is provided for assembling washers 10, 12 and 13 for holding the washers in sealing engagement with seat 8 and for allowing the washers to be lifted from the seat 8 to relieve the pressure within enclosure 5 upon a slight increase in pressure therein. As shown in FIG. 2, a generally rectangular clamp 16 is provided with rounded upwardly bent ends 17 for cooperating with lip surface 7. As shown, the width of rectangular clamp 16 is less than the narrowest dimension of aperture 6 so that the clamp may be passed through the aperture 6 from the outside of cover 5, and the length of clamp 16 is greater than the narrowest dimension of the aperture to thereby prevent clamp 16 from moving through aperture 6 when the ends 17 of clamp 16 are seated on lip portion 7. Upturned ends 17 of clamp 16 cooperate with frusto-conical lip 7 to space the major portion of clamp 16 within aperture 6 to thereby restrict sidewise movement of the clamp with respect to the aperture.

A rivet 18 having a shouldered head 19 and a generally cylindrical portion 20 is provided for uniting the washers and the clamp. As shown in FIG. 2 the cylindrical portion 20 of the rivet extends through openings 21, 22, 23 and 14 formed in the clamp 16, inner aluminum washer 13, silicone rubber washer 10 and outer aluminum washer 12, respectively. A coil compression spring 25 surrounds the cylindrical portion 20 of the rivet and extends between the shouldered head 19 of the rivet and the inwardly facing surface of clamp 16 for urging clamp 16 and the washers outwardly away from head 19. Rivet 18 is upset at the outer end 26 thereof for holding the washers, the coil spring and the clamp onto the rivet.

The above-described construction for sealing aperture 6 facilitates manufacture and assembly. Coil spring 25 and clamp 16 are first slipped over the cylindrical portion of rivet 18 in the appropriate order so that one end of the coil spring abuts the shouldered head 19 of the rivet. The clamp, spring and rivet are then inserted at an angle through the narrowest portion of aperture 6 and the ends 17 of the clamp are seated on lip surface 7. After this operation the silicone rubber washer and the aluminum washers are slipped over the cylindrical portion 20 of rivet 18 in the appropriate order and the outer end of the rivet is upset as at 26.

In operation, should water or other fluids pass through small pin-hole leaks in the brazed joint between the bottom cover 5 and the bottom wall 2 of the cooking vessel or become otherwise trapped within enclosure 5, and should such liquid be vaporized upon energization of heating element 4 to cause an increase in pressure within such enclosure, such pressure will act on the relatively large exposed area of washers 10, 12 and 13 to cause the washers to move downwardly against the compressive force of spring 25 to permit the vapor and fluids under pressure to be released. It can be seen that the washers 10, 12 and 13 are held to the cover in a secure and reliable manner and cannot be blown from the cover while the pressure is being relieved.

It should also be apparent that my improved seal presents a clean appearance with the bottom cover of the cooking vessel since the outer washer is formed from the same material as the bottom cover 5 and is arranged so that the exposed surface of the outer washer and the exposed surface of the cover are substantially in the same plane. The only protrusion at the bottom cover of the vessel resides in the negligible upset end 26 of the rivet 18. With this arrangement the cooking vessel may be easily and completely cleaned to present a pleasing appearance of which a housewife will be proud. It is clear that the watertight seal of this invention is characterized by its simplicity and ease of assembly and its ability to be held securely to the cover while gases under pressure are released from enclosure 5.

While there has been shown and described a particular embodiment of this invention, it will be obvious to those skilled in the art that various other changes and modifications can be made therein without departing from the invention, and therefore, it is aimed in the appended claims to cover all such changes and modifications as fall within the true spirit and scope of the invention.

What I claim as new and desire to secure by Letters Patent of the United States is:

1. An electric cooking vessel comprising a bottom wall; a cover fixed to said bottom wall for cooperating with said bottom wall to form an enclosure; an electric heating element positioned in said enclosure; an aperture surrounded by an outwardly facing frusto-conical seat and an inwardly facing lip formed in said bottom cover; and means cooperating with said aperture to provide a seal therefor; said means comprising a resilient washer sandwiched between an inner metallic washer and an outer metallic washer, the outer peripheral surface of said outer metallic washer being frusto-conical in shape for mating engagement with the outwardly facing frusto-conical seat, and a clamp engaging said lip and being spring connected to said washers for urging said resilient washer and said outer washer into sealing engagement with said seat to prevent the entry of water and foreign matter into said enclosure while the cooking vessel is being washed, and for permitting said washer to be forced from sealing engagement with said seat upon an increase in pressure within said enclosure.

2. An electric cooking vessel comprising a bottom wall; a cover fixed to said bottom wall for cooperating with said bottom wall to form an enclosure at the bottom of said vessel; an electric heating element positioned in said enclosure; said cover being cut and shaped to form an aperture adapted to serve as vent for said enclosure, said aperture being surrounded by an outwardly facing enlarged frusto-conical seat surface formed from the bottom surface of said cover, and an inwardly facing frusto-conical lip surface formed from the cut surface of said cover, the narrowest dimension of said aperture being at the juncture of said seat portion and said lip portion; and means secured within said aperture for sealing said vent against the entrance of water and other fluids from the outside of said enclosure but permitting the egress of fluids and gases under pressure from the inside of said enclosure, said means comprising a resilient silicone rubber washer for engaging said seat sandwiched between an inner metallic washer and an outer metallic washer, the outer peripheral surface of said outer metallic washer being frusto-conical in shape for mating engagement with the outwardly facing frusto-conical seat surface, a clamp engaging said lip surface for holding said resilient washer and said outer washer in sealing engagement with said seat surface, said clamp having a dimension smaller than the narrowest portion of said aperture to permit said clamp to be passed through said aperture and having another dimension greater than the narrowest portion of said aperture for preventing said clamp from moving through said aperture when it is seated on said lip portion; a shouldered rivet extending through said clamp and said washers and being upset at the outer end thereof to engage said outer aluminum washer; and a coil spring surrounding said rivet, said coil spring being positioned between the shouldered head of said rivet and said clamp for urging the upset end of said rivet into engagement with said outer aluminum washer.

3. The electric cooking vessel defined in claim 1 in which the exposed surface of said outer washer and the exposed surface of said cover are substantially in the same plane when said outer washer is in engagement with said seat.

References Cited in the file of this patent

UNITED STATES PATENTS

| | | |
|---|---|---|
| 2,236,238 | Lacy | Mar. 25, 1941 |
| 2,619,316 | Wilson | Nov. 25, 1952 |
| 2,838,650 | Lehr | June 10, 1958 |
| 2,844,164 | Robbins | July 22, 1958 |

FOREIGN PATENTS

| | | |
|---|---|---|
| 204,091 | Australia | Sept. 20, 1956 |